United States Patent [19]

Haddad et al.

[11] Patent Number: 4,737,346
[45] Date of Patent: Apr. 12, 1988

[54] CLOSED CYCLONE FCC CATALYST SEPARATION WITH STRIPPING GAS INJECTION AND DIRECT STEAM INJECTION

[75] Inventors: James H. Haddad, Princeton Junction; Hartley Owen, Belle Mead, both of N.J.

[73] Assignee: Mobil Oil Corporation, New York, N.Y.

[21] Appl. No.: 914,393

[22] Filed: Oct. 2, 1986

Related U.S. Application Data

[62] Division of Ser. No. 612,191, May 21, 1984, Pat. No. 4,623,446.

[51] Int. Cl.$^4$ .............................................. B01J 8/18
[52] U.S. Cl. .................... 422/144; 208/161; 422/145; 422/147; 422/214
[58] Field of Search ............... 422/144, 145, 147, 214; 208/158, 161

[56] References Cited

U.S. PATENT DOCUMENTS

| | | | |
|---|---|---|---|
| 2,584,391 | 2/1952 | Leffer | 208/158 |
| 2,838,063 | 6/1958 | Weits et al. | 208/161 |
| 2,862,786 | 12/1958 | Trainer | 208/160 |
| 2,901,331 | 8/1959 | Held et al. | 208/161 |
| 3,007,778 | 11/1961 | Wood et al. | 208/161 |
| 3,152,066 | 10/1964 | Wickham | 208/163 |
| 3,261,776 | 7/1966 | Baumann et al. | 208/113 |
| 3,355,380 | 11/1967 | Luckenbach | 208/153 |
| 3,661,799 | 5/1972 | Cartmell | 208/153 |
| 3,677,715 | 7/1972 | Morrison et al. | 422/147 |
| 3,785,962 | 1/1974 | Conner et al. | 208/164 |
| 3,826,738 | 7/1974 | Zenz | 208/153 |
| 3,952,022 | 4/1976 | Becuwe | 260/346 |
| 3,964,876 | 6/1976 | James | 208/74 |
| 4,043,899 | 8/1977 | Anderson et al. | 208/161 |
| 4,066,533 | 1/1978 | Myers et al. | 208/153 |
| 4,070,159 | 1/1978 | Myers et al. | 208/161 |
| 4,206,174 | 6/1980 | Heffley et al. | 422/144 |
| 4,219,407 | 8/1980 | Haddad et al. | 208/151 |
| 4,351,275 | 9/1982 | Bhojwani et al. | 422/146 |
| 4,356,151 | 10/1982 | Woebcke et al. | 422/145 |
| 4,364,905 | 12/1982 | Fahrg et al. | 422/144 |
| 4,404,095 | 9/1983 | Haddad et al. | 208/161 |
| 4,446,107 | 5/1984 | Buyan et al. | 422/107 |
| 4,448,753 | 5/1984 | Gross et al. | 422/144 |
| 4,478,708 | 10/1984 | Farnsworth | 208/161 |

FOREIGN PATENT DOCUMENTS 0086580 8/1983 European Pat. Off. .
2077340 10/1971 France .

Primary Examiner—David L. Lacey
Assistant Examiner—William R. Johnson
Attorney, Agent, or Firm—Alexander J. McKillop; Michael G. Gilman; Dennis P. Santini

[57] ABSTRACT

A method and apparatus for fluid catalytic cracking (FCC) in which the output of a riser conversion zone is fed to a riser cyclone separator, a primary cyclone separator, and secondary cyclone separator, connected in series within a single reactor vessel. The riser cyclone separator is connected to the primary cyclone separator by a conduit which prevents random post-riser thermal cracking of the hydrocarbons after they exit the riser cyclone. Means are also provided to blend stripping gas with the cracked hydrocarbons as they travel from the riser conversion zone to said primary cyclone separator. The stripping gas blends with the cracked hydrocarbons to improve the separation of hydrocarbons from catalyst. Steam may also be directly injected into the riser cyclone separator to aid in separation of hydrocarbons from catalyst.

3 Claims, 3 Drawing Sheets

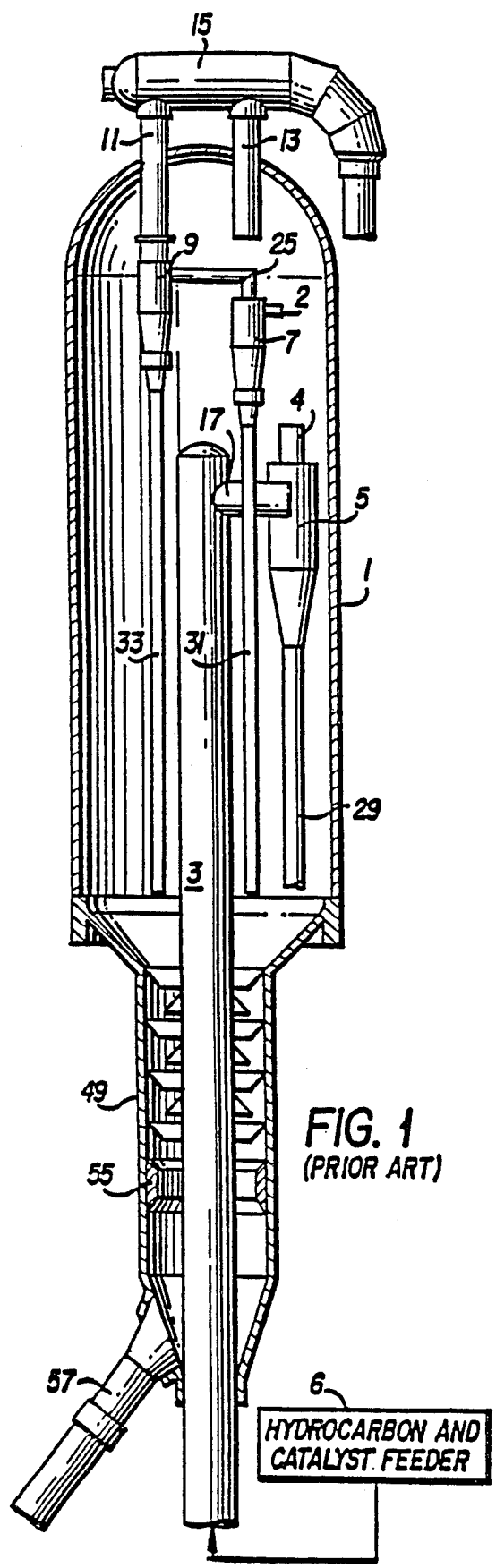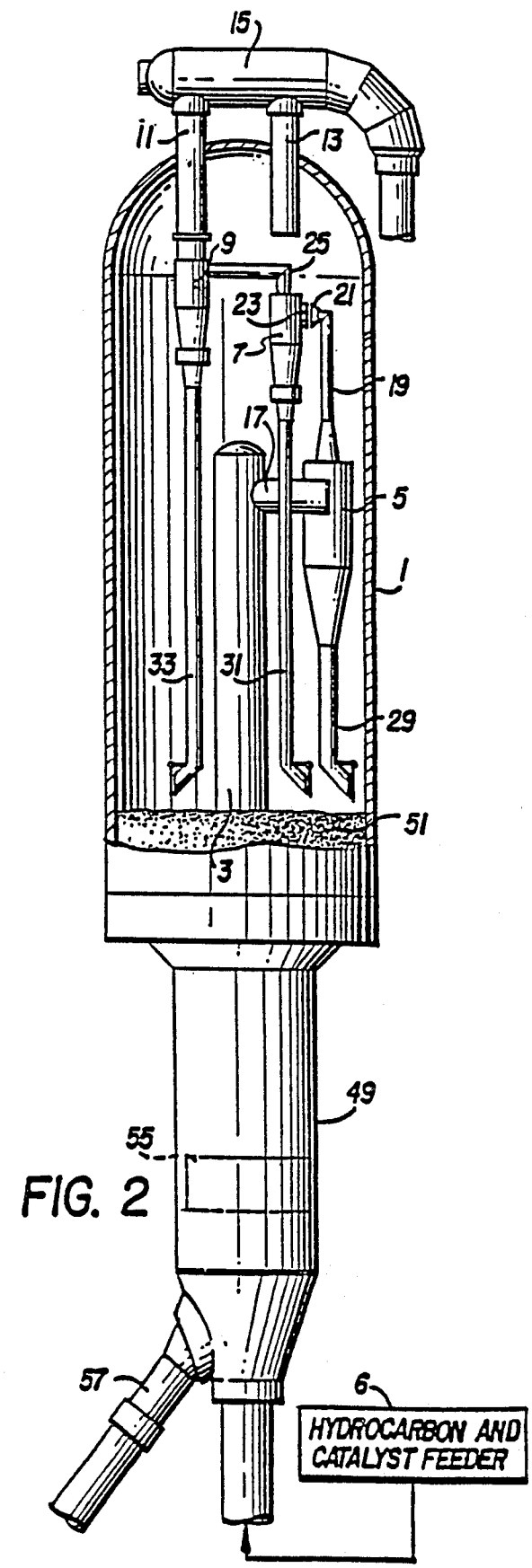
FIG. 1 (PRIOR ART)
FIG. 2

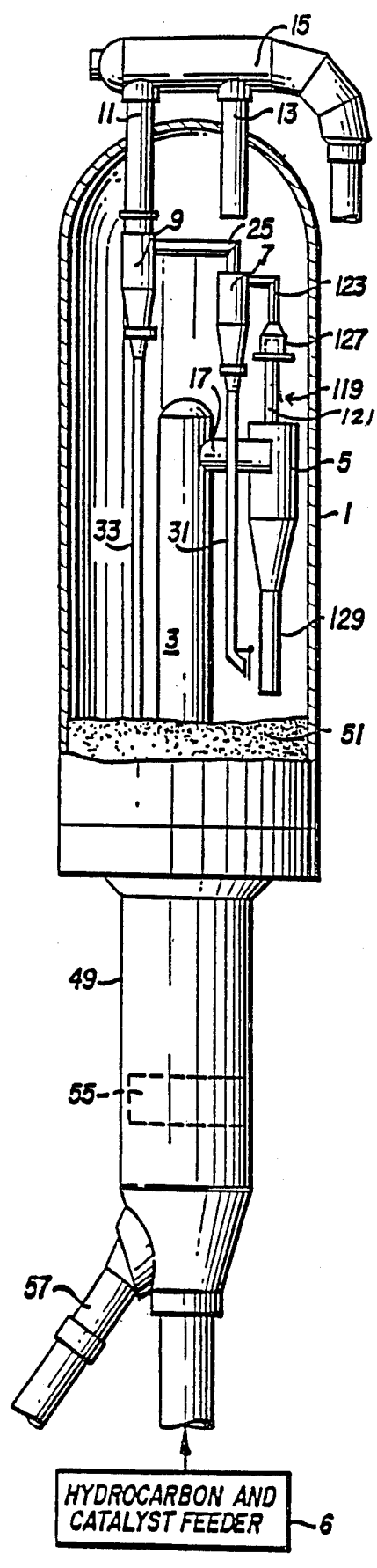
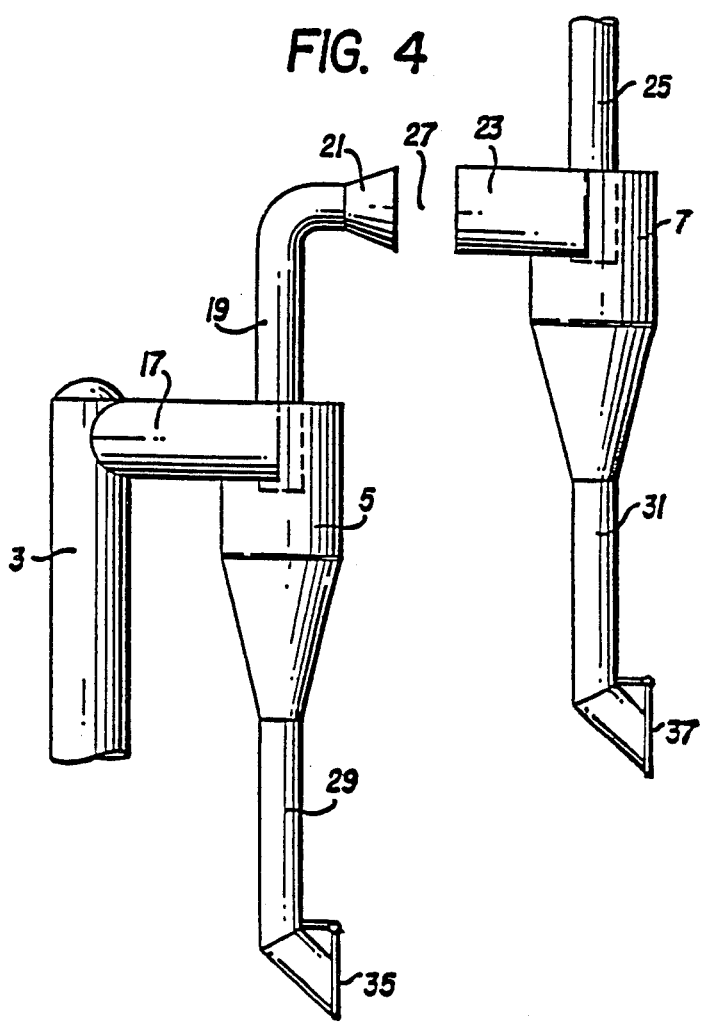
FIG. 3
FIG. 4

CLOSED CYCLONE FCC CATALYST SEPARATION WITH STRIPPING GAS INJECTION AND DIRECT STEAM INJECTION

CROSS-REFERENCE TO RELATED APPLICATION

This is a division of application Ser. No. 612,191, filed May 21, 1984, now U.S. Pat. No. 4,623,446, issued Nov. 18, 1986.

BACKGROUND OF THE INVENTION

1. Field of the Invention

This invention relates to a method and apparatus for separation of the catalyst phase from a gas suspension phase in a fluidized catalytic cracking unit (FCC). More particularly, it relates to improvements in separating the catalyst phase from the gas suspension phase, as the suspension comprising both phases is discharged from a riser conversion zone outlet, to minimize or substantially eliminate post-riser conversion zone cracking.

2. Discussion of the Prior Art

The field of catalytic cracking, particularly fluid catalytic cracking, has undergone significant development improvements due primarily to advances in catalyst technology and product distribution obtained therefrom. With the advent of high activity catalysts and particularly crystalline zeolite cracking catalysts, new areas of operating technology have been encountered requiring refinements in processing techniques to take advantage of the high catalyst activity, selectivity and operating sensitivity.

By way of background, the hydrocarbon conversion catalyst usually employed in an FCC installation is preferably a high activity crystalline zeolite catalyst of a fluidizable particle size. The catalyst is transferred in suspended or dispersed phase condition generally upwardly through one or more riser conversion zones (FCC cracking zones) providing a hydrocarbon residence time in each conversion zone in the range of 0.5 to about 10 seconds, and usually less than about 8 seconds. High temperature riser hydrocarbon conversions, occurring at temperatures of at least 1000 F. or higher and at 0.5 to 4 seconds hydrocarbon residence time in contact with the catalyst in the riser, are desirable for some operations before initiating separation of vaporous hydrocarbon product materials from the catalyst. Rapid separation of catalyst from hydrocarbons discharged from a riser conversion zone is particularly desirable for restricting hydrocarbon conversion time. During the hydrocarbon conversion step, carbonaceous deposits accumulate on the catalyst particles and the particles entrain hydrocarbon vapors upon removal from the hydrocarbon conversion step. The entrained hydrocarbons are subjected to further contact with the catalyst until they are removed from the catalyst by mechanical means and/or stripping gas in a separate catalyst stripping zone. Hydrocarbon conversion products separated from the catalyst and stripped materials are combined and passed to a product fractionation step. Stripped catalyst containing deactivating amounts of carbonaceous material, hereinafter referred to as coke, is then passed to a catalyst regeneration operation.

Of particular interest has been the development of methods and systems for separating catalyst particles from a gas suspension phase containing catalyst particles and vaporous hydrocarbon product materials, particularly with high activity crystalline zeolite cracking catalysts, under more efficient separating conditions so as to reduce overcracking of hydrocarbon conversion products and promote the recovery of desired products of a hydrocarbon conversion operation. Cyclonic equipment is now typically used for efficient separation of fluidizable catalyst particles from the gas suspension phase. However, present day cyclonic equipment often permits backmixing of about 50 percent of the reactor products, which results in an undesirable extended residence time of the product vapor within a large reactor vessel. This extended residence time reduces the desired product yield by as much as 4 percent through nonselective thermal cracking. Recent developments in this art have been concerned with the rapid separation and recovery of entrained catalyst particles from the gas suspension phase.

Various processes and mechanical means have been employed heretofore to effect rapid separation of the catalyst phase from the hydrocarbon phase at the termination of the riser cracking zone, to minimize contact time of the catalyst with cracked hydrocarbons. Several of these are discussed below.

Cartmell, U.S. Pat. No. 3,661,799, discloses a process for catalytic conversion of petroleum feedstocks wherein the fluidized mixture of the cracking catalyst and cracked feedstock leaves a vertically-disposed reactor section and enters a cyclone separator, placed in a separate stripper vessel, through a conduit. The conduit contains an annulus which allows an inert stripping gas and associated stripped vapors to pass into the cyclone separator.

Anderson, et al, U.S. Pat. No. 4,043,899, discloses a method for rapid separation of a product suspension, comprising fluidized catalyst particles and the vaporous hydrocarbon product phase, by discharging the entire suspension directly from the riser conversion zone into a cyclone separation zone. The cyclone is modified to include a separate cyclonic stripping of the catalyst separated from the hydrocarbon vapors. In the method of Anderson et al, the cyclone separator is modified to include an additional downwardly extending section comprising a lower cyclone stage. In this arrangement, catalyst separated from the suspension in the upper stage, slides along a downwardly sloping baffle to the lower cyclone where stripping steam is introduced to further separate entrained hydrocarbon products from the catalyst recovered from the upper cyclone. The steam and the stripped hydrocarbons are passed from the lower cyclone through a concentric pipe where they are combined with the hydrocarbon vapors separated in the upper cyclone. The separated and stripped catalyst is collected and passes from the cyclone separator by conventional means through a dipleg. This process requires that the entire volume of catalyst, gaseous phase and stripping steam pass through the cyclone separator, which means that this equipment must be designed to efficiently handle not only a large vapor volume, but also a large quantity of solid particles.

Myers et al, U.S. Pat. No. 4,070,159, provides a separation means whereby the bulk of catalyst solids is discharged directly into a settling chamber without passing through a cyclone separator. In this apparatus, the discharge end of the riser conversion zone is in open communication with the disengaging chamber such that the catalyst discharges from the riser in a vertical direction into the disengaging chamber which is otherwise essentially closed to the flow of gases. A deflector cone mounted directly above the terminus of the riser causes the catalyst to be directed in a downward path so as to prevent the catalyst from abrading the upper end of the disengaging vessel. The cyclone separator is of the usual configuration employed in a catalytic cracking unit to separate entrained catalyst particles from the cracked hydrocarbon products so that the catalyst passes through the dipleg of the cyclone to the body of the catalyst in the lower section of the disengaging vessel and the vaporous phase is directed from this vessel to a conventional fractionation unit. There is essentially no net flow of gases within the disengaging vessel beyond that resulting from a moderate amount of steam introduced to strip the catalyst residing in the bottom of the disengaging vessel.

Haddad et al, U.S. Pat. No. 4,219,407, discloses the separation of the catalyst from the gasiform cracked products in a fashion which permits effective steam stripping of the catalyst. The suspension of catalyst and gasiform material is discharged from the riser conversion zone outwardly through radially extending passageways, or arms, which terminate in a downward direction. Catalyst stripping zones, or strippers, are located beneath the terminus of each of the radially extending passageways. Each stripper consists of a vertical chamber open at the top and the bottom with downwardly sloping baffles located within the chamber so as to cause the catalyst to flow in a discontinuous manner countercurrently to upwardly flowing stripping steam introduced at the lower end of the stripping chamber. The radially extending arms are each provided with a curved inner surface and confining sidewalls to impart a cyclonic concentration of catalyst particles promoting a forced separation thereof from the hydrocarbon vapors, such that it concentrates catalyst particles as a downwardly confined stream which discharges generally downwardly and into the open upper end of the catalyst stripping chamber. A vapor disengaging space is provided between the discharge end of the radially extending arms and the top of the catalyst strippers to promote the rapid removal of separated vapors form the catalyst. The separated vapors pass upwardly through the disengaging vessel to the open inlet of a cyclone separator which removes entrained catalyst from the gasiform material for return through a dipleg to the body of steam stripped catalyst while the separated vaporous material passes to a fractionation unit. The hydrocarbon product, as it passes within the disengaging vessel from the discharge of the radially extending arms to the cyclone separator, travels in a random fashion and is exposed to catalytic reaction temperatures which may cause undesirable side reactions and thermal cracking before these vapors enter a quench zone in the main fractionator of the fluid cracking unit.

Haddad et al, in U.S. patent application Ser. No. 400,843, filed July 22, 1982, the disclosure of which is incorporated herein by reference, discloses an FCC reactor comprising a riser with radially extending sidearms as the first catalyst-hydrocarbon separation means. The sidearms force the suspension of the catalyst and the hydrocarbons to suddenly change the direction of flow from the vertical to the horizontal thereby forcing preliminary separation of the gaseous hydrocarbons from the solid catalyst particles. The catalyst particles fall in a downward direction, to a stripping means, while the hydrocarbons, with some entrained catalyst particles, proceed to a secondary separation means, such as a cyclone. The sidearms and the secondary separation means are enclosed by a vertical conduit to prevent random uncontrolled thermal cracking of the hydrocarbons. However, the vertical conduit provided to send hydrocarbons from the side arms to the secondary separation means does not accommodate radial and longitudinal thermal expansion of the separation means.

SUMMARY OF THE INVENTION

It is a primary object of this invention to provide an improved process and apparatus for rapidly separating cracking catalyst from a hydrocarbon vapor/catalyst particle suspension in a fluid catalytic cracking (FCC) process.

It is another object of this invention to provide a method and an apparatus for separating cracking catalyst from a hydrocarbon vapor/catalyst suspension, whereby the length of time the suspension is subjected to high temperature after separation from the bulk of the catalyst is minimized to reduce the overcracking of the cracked products.

It is another object of this invention to provide an apparatus for admitting a stripping gas to a hydrocarbon vapor/catalyst particle suspension where a conduit between the riser conversion zone and subsequent cyclone separators or between successive cyclone separators has therein a means for admitting the stripping gas to the suspension.

It is another object of this invention to provide a method and apparatus for admitting stripping gas through a dipleg of a first cyclone.

It is another object of this invention to provide an improved method and apparatus for controlling catalyst flow through a cyclone dipleg.

It is another object of this invention to provide an improved method and apparatus for better withstanding catalyst surges in a closed cyclone FCC system.

In its method aspects, the invention achieves the foregoing objects by an FCC method comprising the steps of passing a suspension of catalyst and hydrocarbon vapors through an FCC cracking zone, such as an FCC riser, passing the cracked hydrocarbons through a riser conduit into a riser (first) cyclone which separates the catalyst from the suspension, further passing the suspension from the first cyclone to a second cyclone through an overhead conduit comprising an outlet duct of the riser cyclone and an inlet duct of the primary cyclone. The outlet and inlet ducts are axially aligned and spaced apart to form a port, and the method further comprises passing a stripping gas from a reactor vessel into the port to form a mixture with the cracked hydrocarbon vapor/catalyst particle suspension. The method may also include the steps of passing the suspension through subsequent cyclones and passing separated catalyst through cyclone diplegs to a catalyst stripping zone.

In lieu of passing stripping gas through the second conduit, the method may employ admission of stripping gas into the first conduit or through the riser cyclone dipleg. In addition, steam may be passed into the riser cyclone through a port other than that used by the stripping gas.

In its apparatus respects, the invention comprises a reactor vessel housing a riser hydrocarbon conversion zone which is an elongated tubular conduit having a downstream end which terminates in the reactor vessel; means for feeding a suspension of hydrocarbon and catalyst into the riser conversion zone to produce a mixture of catalyst and cracked hydrocarbon which exits from the downstream end of the riser conversion zone; a riser (first) cyclone separator which is connected to a downstream end of the riser by a riser conduit; a primary (second) cyclone separator connected to an outlet of the riser cyclone by an overhead conduit, with the riser conduit completely separating the suspension passing therethrough from the atmosphere of the reactor vessel, and the overhead conduit comprising an outlet duct of the riser cyclone separator, and spaced therefrom an inlet duct to the primary cyclone separator. The outlet duct is axially aligned with the inlet duct to direct cracked hydrocarbon and catalyst from the outlet duct to the inlet duct and the spacing between the outlet and inlet ducts forms a port for admitting stripping gas into the primary cyclone. The apparatus of the invention may include means for conducting cracked hydrocarbon from the primary cyclone out of the reactor vessel. A catalyst stripping zone is located with the reactor vessel and diplegs are provided for conducting catalyst from at least the primary cyclone separator to the catalyst stripping zone.

In other embodiments of the invention, the riser cyclone separator may be connected to the primary cyclone separator by an enclosed tube and stripping gas may be admitted through the riser conduit or the riser cyclone separator dipleg. In addition, an apparatus for directly injecting steam into the riser cyclone separator may be included in the above-described embodiments. The diameter of the riser cyclone separator dipleg may be sized to admit stripping gas into the dipleg or to reduce the quantity of reactor products flowing down the dipleg with the collected catalyst.

BRIEF DESCRIPTION OF THE FIGURES

FIG. 1 is a schematic representation of a side view of a fluid catalytic cracking (FCC) reactor of the prior art;

FIG. 2 is a schematic representation of a side view of a fluid catalytic cracking (FCC) reactor of one embodiment of the present invention;

FIG. 3 is a schematic representation of a side view of a fluid catalytic cracking (FCC) reactor of a second embodiment of the present invention;

FIG. 4 is an enlarged illustration of the detail of the conduit between the riser and the primary cyclone separator of the first embodiment;

DETAILED DESCRIPTION OF THE INVENTION

Figure 5:
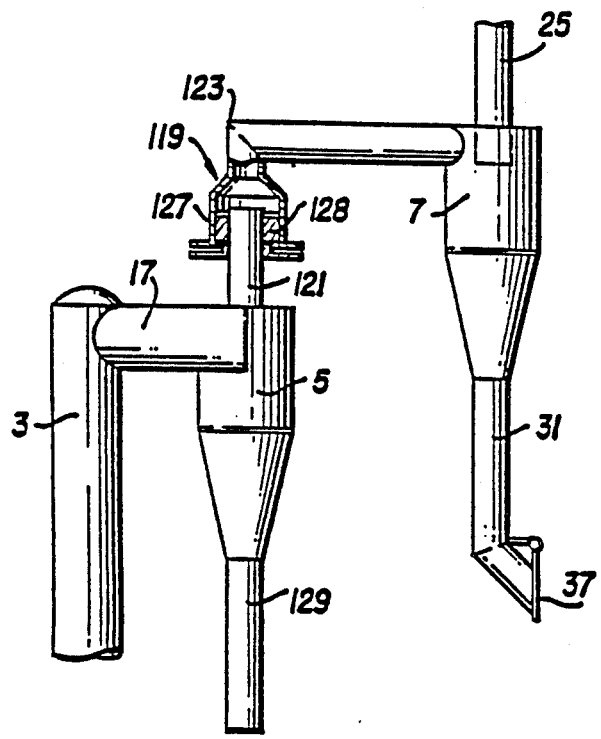
FIG. 5 is an enlarged illustration of the detail of the conduit between the riser and the primary cyclone separator of the second embodiment.

As well known, a fluid catalytic cracking (FCC) process employs a catalyst in the form of very fine particles which act as a fluid when aerated with a vapor. The fluidized catalyst is circulated continuously between a reaction zone and a regeneration zone and acts as a vehicle to transfer heat from the regenerator to the hydrocarbon feed and reactor. The FCC process is valuable to convert heavy hydrocarbons into more valuable gasoline and lighter products.

The prior art, as shown in FIG. 1, uses an open reactor configuration in which catalyst particles and hydrocarbon vapor feed from a hydrocarbon and catalyst feeder 6, pass together as a suspension through a riser 3, and enter a riser cyclone 5 via conduit 17, with the catalyst being separated therein from the suspension and sent to the bottom of a reactor vessel 1. The separated hydrocarbons in cyclone 5 pass overhead into the reactor vessel 1, and from there pass through a series of cyclones 7,9, which further remove catalysts entrained with the hydrocarbons. In this system, any hydrocarbons exiting overhead from the riser cyclone 5 into the reactor vessel 1, tended to backmix and therefore remain in the reactor vessel 1 for too long, causing overcracking and loss of control of the hydrocarbon products.

The present invention is directed to a closed reactor method and apparatus, in which catalyst particles in the suspension exiting overhead of the riser cyclone 5 are directly fed into subsequent cyclones 7,9, for quick removal of the catalysts so that the hydrocarbons may be stripped away from the catalyst and exit the reactor vessel through conduit 11 before they have time to overcrack. Overcracking is presently a problem because of recently developed catalysts which have very high reactivity.

It is advantageous to mix a catalyst stripping gas from the reactor vessel with the gas suspension as it enters, is in, or exits from the riser cyclone 5 as an aid in removing hydrocarbons from the catalyst particles. To achieve this goal, a conduit between the riser conversion zone 3 and riser cyclone 5 or a conduit between the riser cyclone 5 and the next adjacent cyclone, or a conduit between cyclones in a series of cyclones has an opening formed to receive a stripper gas into the conduit.

The invention will now be described in greater detail in connection with specific embodiments thereof illustrated in FIGS. 2-7. These embodiments, however, are not to be construed as a limitation on the scope of the invention, but are merely provided by way of exemplary illustration.

In the apparatus aspects of the first embodiment, and referring to FIG. 2, a reactor vessel 1 has a catalyst stripping section 49 at a lower bottom portion thereof. The reactor vessel 1 surrounds the upper terminal end of a riser 3 (also referred to as a riser conversion zone), to which are connected a riser (first) cyclone 5, a primary (second) cyclone 7, and secondary cyclone 9. The riser cyclone 5 is connected to the riser 3 by means of a riser conduit 17, which is a conventional closed conduit. The riser cyclone 5 in turn is connected to the primary cyclone 7 by means of an overhead conduit 19. The primary cyclone 7 is connected with the secondary cyclone 9 by a conventional closed conduit 25. Overhead gas from the secondary cyclone 9, or other secondary cyclones in parallel (not shown), exits the reactor vessel 1 by means of an overhead conduit 11 for cyclone 9, or conduit 13, for a parallel set of cyclones. The gases which exit the reactor through the overhead conduit 11 and the overhead conduit 13 are combined and exit through the reactor overhead port 15. Catalyst particles separated by the cyclones 5,7,9 drop through cyclone diplegs 29, 31, and 33 respectively and feed the reactor stripper zone 49 which removes hydrocarbons adhering to the catalyst. It will be apparent to those skilled in the art that although only one series connection of riser, primary, and secondary cyclones 5,7,9 are shown in the embodiment of FIG. 2, more than one series connection and/or more or less than three consecutive cyclones could be used.

The overhead conduit 19, as shown in FIG. 4, provides a passageway for hydrocarbons and catalyst particles to directly travel from the riser cyclone 5 to primary cyclone 7 without entering the reactor vessel 1 atmosphere. However, a means is provided to admit stripping gas from the reactor vessel 1 into the conduit 19. The conduit 19 includes an outlet duct 21 of the riser cyclone 5 and, spaced therefrom, an inlet duct 23 of the primary cyclone 7. The spacing between outlet duct 21 and inlet duct 23 forms a port 27 which allows stripping gas to enter the inlet duct 23 to aid in separating catalyst from hydrocarbons adhering to the catalyst. The outlet duct 21 and inlet duct 23 may be axially aligned horizontally (FIG. 4) or vertically. In addition, the size and shape of the opening in outlet duct 21 should be adjusted to match that of the inlet duct 23.

The separated catalyst from cyclones 5, 7 and 9 pass through respective diplegs 29, 31 and 33 and are discharged therefrom, after a suitable pressure is generated within the diplegs by the buildup of the catalyst. The catalyst falls into a bed of catalyst 51. The diameter of the riser cyclone dipleg 29 may be minimized to reduce the quantity of reactor products flowing down the dipleg 29 with the collected catalyst. Stripping gas from below sweeps this small quantity of hydrocarbon product from the dipleg into the primary cyclone 7, causing it to leave the reactor vessel 1 with the other reaction products. The diplegs 29, 31 and 33 may be sealed, such as being extended into the catalyst bed 51 or by trickle valves 35, 37. In addition, the diameter of the dipleg may be adjusted to control the flow rate of catalyst therein.

Within catalyst bed 51 is a conventional stripping section 49, where the catalyst is contacted with a stream of stripping gas such as steam, flowing countercurrently to the direction of flow of the catalyst. The stripping gas is introduced into the lower bottom portion of the stripping section 49 by one or more conventional conduits 55. Stripped catalyst is removed by a conduit 57 for passage to a catalyst regeneration zone or second stage of hydrocarbon conversion zone, depending on the activity and the amount of carbonaceous material, or coke, deposited on the catalyst particles.

In the method using the apparatus illustrated in FIG. 2, a suspension mix of hydrocarbon and catalyst is introduced into a riser 3 by a feeder 6. The suspension of cracked hydrocarbons and catalyst pass from riser 3, through a riser conduit 17, into the riser cyclone 5. The suspension passes through an overhead conduit 19, comprising outlet duct 21 and inlet duct 23 and across port 27 and into the primary cyclone 7. The suspension may then pass through conduit 25 into a secondary cyclone 9, subsequently exit the reactor as catalyst-free cracked hydrocarbons through overhead conduit 11, and pass to a downstream fractionation apparatus. The catalyst is separated in the cyclones 5, 7 and 9 and passes through respective cyclone diplegs 29, 31 and 33 to the catalyst stripping section 49, from which the catalyst passes to subsequent reactor vessels or a regeneration vessel, through conduit 57, depending on its activity. Stripping gas is introduced into the suspension through port 27.

In another embodiment of the invention illustrated in FIGS. 3 and 5, the pressure inside the riser cyclone 5 is set lower than that of the reactor vessel 1 and, as a consequence, the riser cyclone dipleg 129 may be modified to allow stripping gas to enter through the dipleg 129 rather than through port 27. The bottom opening of the dipleg is thus in open communication with the reactor vessel 1 and the dipleg diameter is sized, such that the velocity of stripping gas countercurrent to falling catalyst is in the range of about 0.1 to about 1.0 feet per second. The dipleg 129 diameter also allows the riser cyclone 5 to better withstand catalyst surges, since the catalyst can more readily drop through as the diameter thereof is larger than conventional. In addition, the riser cyclone 5 is connected to the primary cyclone 7 by a riser cyclone overhead conduit 119, which comprises an upstream portion 121 which extends from the riser cyclone 5 and a downstream portion 123 which connects with the inlet of primary cyclone 7. The downstream portion 123 overlaps upstream portion 121 and they are connected by a packed joint 127 filled with packing 128, or by bellows (not shown). The packed joint 127 or bellows serves as an expansion joint.

In the embodiment illustrated in FIGS. 3 and 5, the stripping gas passes into the riser cyclone dipleg 129 and then into riser cyclone 5, instead of entering through port 27 as in the FIG. 2 embodiment.

Figure 6:
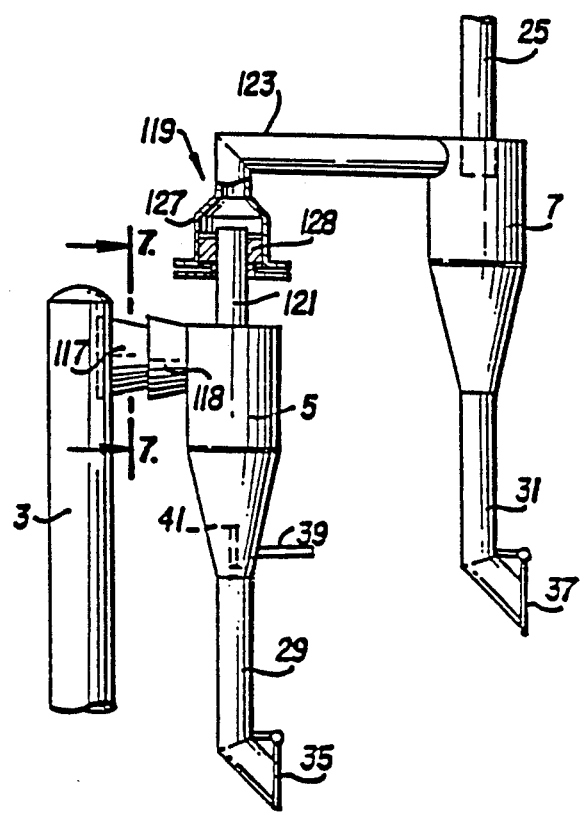
FIG. 6 is an enlarged illustration of the detail of the conduit between the riser cyclone separator and the primary cyclone separator of a third embodiment.
Figure 7:
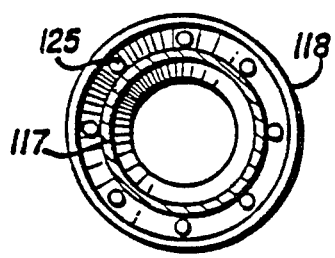
FIG. 7 is a cross-sectional view taken along the lines 7—7 of FIG. 6.

FIGS. 6 and 7 illustrate another modification of the invention. In this embodiment, the riser conduit is modified to comprise an upstream portion 117 and a larger diameter overlapping downstream portion 118. The upstream portion 117 is configured as a pipe which extends into the downstream portion 118. An annulus is formed between the upstream 117 and downstream 118 portions, which is covered by a substantially flat metal ring having orifices 125 in open communication with the reactor vessel 1 atmosphere, enabling stripping gas to pass through these orifices into the downstream conduit 118. The cyclone diplegs 29, 31 may be sealed by trickle valves or other conventional means. In addition, the riser cyclone 5 is connected by a closed conduit 119 to the primary cyclone 7.

In an additional modification, steam may be injected into the riser cyclone 5 through a steam line 39, as also shown in FIG. 6. A gas directing tube 41 may be located within the riser cyclone 5 to prevent reentrainment of gases.

In the FIG. 6 embodiment, pressure in the riser cyclone 5 is lower than within the reactor vessel 1, so the stripping gas passes into the downstream end 118 of the riser conduit through orifices 125. In addition, a suspension of cracked hydrocarbons, catalyst and stripping gas passes through closed conduit 119 to primary cyclone 7.

Steam may also be injected into the riser cyclone 5 to mix with the suspension and aid in removing hydrocarbons adhering to the catalyst.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended hereto.

We claim:
1. An apparatus for the fluid catalytic cracking of a hydrocarbon feed in a closed cyclone system comprising:
   a reactor vessel having an atmosphere;
   a riser conversion zone comprising a vertically disposed elongated tubular conduit having an upstream end and a downstream end, said downstream end terminating within said reactor vessel;

means for introducing a suspension of hydrocarbon feed and catalyst into said upstream end of said riser conversion zone and discharging a mixture of said catalyst and cracked hydrocarbon feed from said downstream end of said riser conversion zone;

a riser cyclone separator within said reactor vessel connected to said riser downstream end by a first conduit for passing said mixture from said riser into said riser cyclone without adding said mixture to said reactor vessel atmosphere, and a primary cyclone separator, within said reactor vessel, connected to said riser cyclone separator by a second conduit, thereby preventing contact of said reactor vessel atmosphere with an interior of said second conduit;

means for conducting cracked hydrocarbons, from an outlet of said primary cyclone separator to outside said reactor vessel without adding said cracked hydrocarbons to said reactor vessel atmosphere;

a catalyst stripping zone within said reactor vessel;

means for conducting catalyst from said primary cyclone separator to said catalyst stripping zone; and a riser cyclone dipleg sized for passing at least a portion of a stripping gas from said catalyst stripping zone therethrough into said riser cyclone, countercurrent to catalyst passing downwardly through said dipleg, to mix with said mixture of cracked hydrocarbons and catalyst in said riser cyclone and then discharge from said riser cyclone through said second conduit.

2. An apparatus of claim 1, wherein said riser cyclone separator dipleg is sized such that the velocity of stripping gas countercurrent to downwardly passing catalyst is in the range from about 0.1 to about 1.0 feet per second.

3. An apparatus of claim 1, wherein said riser cyclone separator includes a steam feed line located in a side wall of a lower portion of said riser cyclone separator and a steam directing tube located within said riser cyclone separator.

* * * * *